United States Patent [19]

Reif et al.

[11] 4,430,738
[45] Feb. 7, 1984

[54] ARRANGEMENT FOR THE CURRENT LIMITATION DURING THE CURRENT SUPPLY OF ELECTRICALLY EXCITED GAS LASERS

[75] Inventors: Werner Reif, Klosterneuburg; Dieter Schuöcker, Vienna, both of Austria

[73] Assignee: Voest-Alpine Aktiengesellschaft, Linz, Austria

[21] Appl. No.: 290,303

[22] Filed: Aug. 5, 1981

[30] Foreign Application Priority Data

Aug. 14, 1980 [AT] Austria .................................. 4166/80

[51] Int. Cl.³ ............................................. H01S 3/00
[52] U.S. Cl. ........................................ 372/38; 372/29; 372/81; 372/33; 315/DIG. 7; 315/165; 315/171; 315/164
[58] Field of Search ........................... 372/38, 85, 29; 307/285, 270; 315/165, 171, 164, DIG. 7, 163

[56] References Cited

U.S. PATENT DOCUMENTS 3,772,613 11/1973 Smith ..................................... 372/38
4,061,986 12/1977 Barker ................................... 372/38

OTHER PUBLICATIONS

P.A. Bokhan, et al., "Sealed Copper Vapor Laser", Sov. J. Quant. Electron., vol. 5, No. 1, Jul. 1975.

Primary Examiner—William L. Sikes
Assistant Examiner—Léon Scott, Jr.
Attorney, Agent, or Firm—Brumbaugh, Graves, Donohue & Raymond

[57] ABSTRACT

An arrangement for the current limitation during the current supply of electrically excited gas lasers includes a rotary current transformer, self-inductances provided in front of a rotary current bridge rectifier, and a capacitor, if desired. In each phase conductor an inductance is provided between the secondary side of the rotary current transformer preferably working at power frequency and the rotary current bridge rectifier.

4 Claims, 1 Drawing Figure

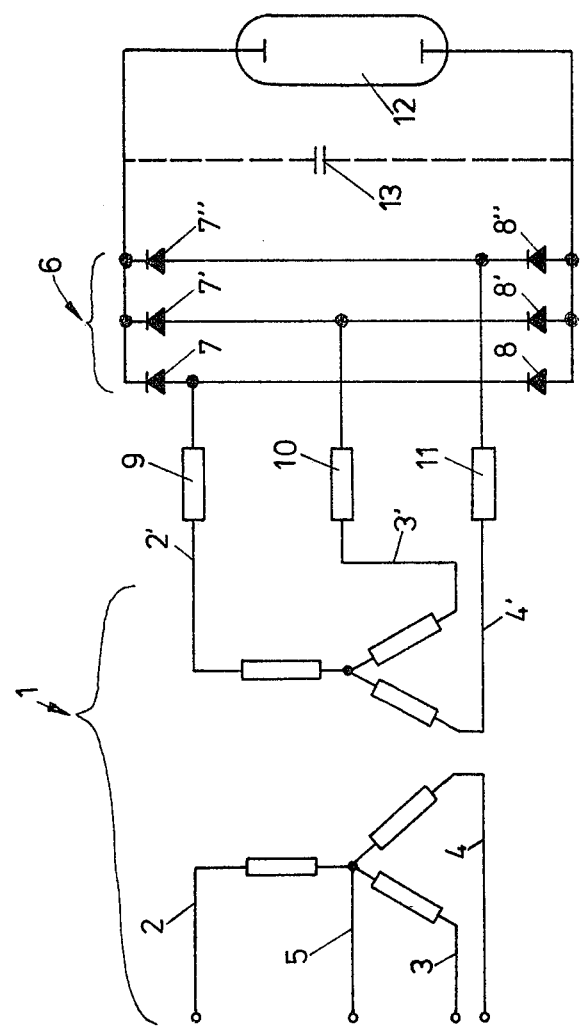

ARRANGEMENT FOR THE CURRENT LIMITATION DURING THE CURRENT SUPPLY OF ELECTRICALLY EXCITED GAS LASERS

BACKGROUND OF THE INVENTION

The invention relates to an arrangement for the current limitation during the current supply of electrically excited gas lasers comprising a rotary current transformer, self-inductances provided in front of a rotary current bridge rectifier, and a capacitor, if desired.

With electrically excited gas lasers a glow-discharge must be maintained in the space within the optical resonator for the formation of a so-called plasma. Thus the operational voltage of such a laser is chosen to be of a value dependant upon the pressure of the gas to be excited, which gas may contain, for instance, Ar, Kr, Xe, F, $N_2O$, HF, $N_2$, CO, $CO_2$ and He, and the spacing between the electrodes; the higher the pressure of the gas and the greater the spacing between electrodes, the higher the value of the operational voltage.

If the electrodes of a gas laser are fed with a sufficiently high voltage, a gas discharge will ignite with a narrow break-through channel forming at first. If the current flowing in the break-through channel is increased so rapidly that the primary discharge channel has no time to widen laterally, high current densities occur there, leading to a very strong heating of the channel, with a discharge in the form of an electric arc thus finally forming. This type of discharge is not suited for the excitation of the laser gas, due to the high temperatures prevailing therein.

The field strength E in the discharge is of a decisive influence on the excitation of the gas molecules, for instance of $CO_2$ molecules, since the gain of energy by the electrons between two collisions of gas molecules is proportional to the value E/p (p=pressure). With $E/p = = (0.075 \text{ V/Pa·cm})$, about 70% of the energy delivered by the electrons is used for the desired excitation of oscillations of the gas molecules, whereas, when observing this relation, only a small part of the electron energy serves for the excitation of the electron sheaths and for the ionization of the atoms, thus getting lost in view of the attainable optical output performance.

Yet, with pressures of above approximately 0.133 bar and when exceeding a critical value of the current intensity, a glow discharge becomes unstable and extremely easily contracts into an arc channel. However, as already mentioned, only a glow discharge is suited for excitation, due to the low gas temperature with a simultaneously high electron energy prevailing therein. The period of time necessary for a glow discharge to develop into an arc discharge is in the range of some microseconds ($\mu s$), so that a spacially homogenous plasma with gas pressures higher than about 0.133 bar can be maintained for only few $\mu s$ (cf. e.g. W. W. Duley, $CO_2$-Lasers, Effects and Applications, Academic Press, New York, S. Francisco, London 1976, pp. 15 to 72, in particular pp. 36 to 39).

For preventing the development into an arc discharge, accordingly large ballast resistors are usually used, which delimit the current so that the discharge current cannot exceed a certain value with a predetermined supply voltage.

The greater the negative differential resistance of the glow discharge, the greater the ballast resistor must be in order to be able to adjust a stable operating point.

With relatively high pressures, multiple subdivided electrodes are used. Therein, discharge instabilities and inhomogenities occur, which again may be prevented by high ohmic ballast resistors at each partial electrode. The superposition of such resistors has the extremely great disadvantage that approximately as much electric power is used in the ballast resistors as in the gas discharge itself and is given off as heat loss. $CO_2$ lasers of the above-defined kind including segmented anodes and air-cooled ballast resistor chains are described, for instance, in the pamphlet 2/79 (1979) of Kristalloptik-Laser-bau GmbH having the designations KEL T 51 and KEL T 52; the high-voltage supply there is effected by means of a rotary current transformer with a subsequently arranged rotary current bridge rectifier.

From U.S. Pat. No. 3,758,877 it has become known to actuate an electrically excited, continuously working $CO_2$ gas laser with a current supply system comprising a current source for high frequency AC, a rectifier, a filter capacitor in parallel connection and an inductance in series connection. It is essential that the frequency of the AC exceeds a certain value, i.e. that limit which separates the region of the negative differential resistance of the laser discharge tube at low frequencies from that of the positive differential resistance. The indicated limit generally is in the magnitude of 1 kHz.

With such an arrangement a high-frequency AC has to be generated, which alone necessitates considerable expenditures. The entire arrangement has to be shielded off in order to prevent disturbances of the surrounding caused by high-frequency stray fields. For smoothing the pulsating AC generated, a capacitor also is required.

In German Offenlegungsschrift No. 26 57 893 a current supply in a pulsed mode is suggested for a gas discharge laser, in which a main DC supply is connected in series with a current-limited DC supply and the laser electrodes, and wherein diode means are connected via the second current supply in order to avoid the same and to feed voltage from the main current supply to the laser electrodes after the laser gas has been ionized. According to a preferred embodiment of this current supply system a rotary current transformer with a rotary current bridge rectifier is provided as second current supply in order to be able to do without capacitor, thus ensuring a short recovery time of the current supply. The chokes provided between the source for the three-phase AC and the primary coils apparently serve for damping the input currents to the current transformer, supporting the behaviour desired according to German Offenlegungsschrift No. 26 57 893 to reduce the voltage of the rotary current supply under load to practically zero, because the high primary current of the transformer in the chokes causes a considerable voltage drop and thus a substantially smaller primary voltage (p. 8 of German Offenlegungsschrift No. 26 57 893).

SUMMARY OF THE INVENTION

The invention has as its object to provide a current supply system for gas lasers with an automatic current limitation and a lower stray power, working with low-frequency AC without previous transformation into higher-frequency AC, wherein the delivered high direct voltage can be applied directly to a gas laser without a separate smoother, such as a capacitor.

This object is achieved with an arrangement of the initially-defined kind in that in each phase conductor an inductance is provided between the secondary side of the rotary current transformer preferably working at power frequency and the rotary current bridge rectifier.

The three inductances suitably are chosen to be equally large. The inductances replace the ballast resistors used so far with the gas excitation of continuous wave lasers.

In the book "Electric Discharge Lamps" by J. F. Waymouth, The M.I.T. Press, Cambridge, Mass., and London, England, pp. 307 to 334, current supply systems for discharge lamps are described in which the current-voltage characteristic also is descending. There, the losses of ohmic resistances are compared with those of AC resistances, the ratios with the utilization of different circuits being thoroughly discussed.

Accordingly, the power required for the magnetic reversal of the core of a choke is much smaller than the thermal power loss of an ohmic ballast resistor; the losses with a laser fed by an arrangement according to the invention amount to about 1/5 only, as compared to one with ohmic ballast resistors. The total efficiency of a laser actuated by an arrangement according to the invention thus has decisively been improved.

The impedance $\omega$-L of the three chokes has to be equal to an ohmic ballast resistor necessary for the same discharge, as to the order of magnitude.

Preferably, chokes of 10 to 20 henry each are installed as inductances. This corresponds to an impedance of 3.1 to 6.3 k$\Omega$ at a power frequency of 50 Hz.

BRIEF DESCRIPTION OF THE DRAWING

The invention will now be explained in more detail with reference to the accompanying single FIGURE, in which a circuit according to the present invention in cooperation with a laser discharge tube is schematically illustrated.

DETAILED DESCRIPTION OF THE DRAWING

In the drawing the circuit principle of an arrangement according to the invention in cooperation with a laser discharge tube is explained, wherein a rotary current transformer 1 comprises phase conductors 2, 3, 4 and 2', 3', 4', and a zero conductor 5, i.e. in star-star connection in the embodiment illustrated. The rotary current bridge rectifier 6 with the electric valves 7, 7', 7" and 8, 8', 8" is connected, on the one hand, with the secondary-side phase conductors 2', 3' and 4' via chokes 9, 10 and 11, and on the other hand, with a schematically illustrated laser discharge tube 12. Parallel to the discharge tube, a capacitor 13 may be arranged between the rotary current bridge rectifier and the tube, whose supply conduits are shown in broken lines in the embodiment illustrated.

As single rectifier, structural elements, such as semiconductor diodes, may be used in the bridge rectifier.

If the primary side of the transformer is connected, for instance, to the normal power circuit at a frequency of about 50 Hz, a corresponding three-phase high voltage is formed on the secondary side. The intensity of the flowing AC is delimited by the chokes. Since there is a precisely defined relation between the AC effective values and the DC with all bridge rectifier circuits, also the maximum amplitude of the Dc flowing in the glow discharge is determined simultaneously by these chokes, as long as the individual phase voltages are not changed.

The DC generated by the bridge rectifier, due to the superposition of phases, is smoothed so well that a separate smoother capacitor 13 may be unnecessary in most cases. This is desirable, because compensating processes may possibly take place between the chokes and the capacitor. Moreover, with a rotary current bridge rectifier, at least two electric valves are always polarized in the conducting direction so that no problems with regard to the phase shifts between the current and the voltage caused by the individual chokes can occur.

The arrangement according to the invention is suited e.g. in particular for the current supply of the auxilary discharge of a transversely electrically excited (TEA) laser working in a pulsed mode as described, for instance, in the European patent application published under No. 0,011,062.

Also with so-called continuous-wave pin-electrode lasers, the current supply by an arrangement according to the invention is optimally ensured per pin electrode. The mode of operation and the structure of such lasers are disclosed on pages 36 to 44 of "$CO_2$-Lasers, Effects and Applications" by W. W. Duley, Academic Press, New York, S. Francisco, London, 1976.

What we claim is:

1. An arrangement for limiting the supply of an electric current to an electrically excited gas laser, comprising
    a rotary current transformer connected to receive power from an A.C. power supply and having a primary side and a secondary side, both said primary and secondary sides including phase conductors,
    inductances connected in each of said phase conductors of said transformer secondary side to limit the current provided at said transformer secondary side, and
    a current bridge rectifier connected to said inductances for producing at its output a substantially smooth D.C. output for said laser.

2. An arrangement as set forth in claim 1, further including a capacitor connected across the output of said current bridge rectifier.

3. An arrangement as set forth in claim 1, wherein said A.C. power supply is at a normal power frequency and said primary side of said rotary current transformer is connected directly to said A.C. power supply.

4. An arrangement as set forth in claim 1, wherein said inductances comprise chokes having values of about 10 to 20 henry.

* * * * *

UNITED STATES PATENT AND TRADEMARK OFFICE
CERTIFICATE OF CORRECTION

PATENT NO. : 4,430,738　　　　　　　　　　　　　　Page 1 of 2
DATED : Feb. 7, 1984
INVENTOR(S) : Reif et al.

It is certified that error appears in the above—identified patent and that said Letters Patent is hereby corrected as shown below:

First page, 2nd col., following the fourth line, insert:

```
--3,436,595    4/1969    Kneisley et al.
  3,758,877    9/1973    Fletcher et al.

FOREIGN PATENT DOCUMENTS 119,685    11/1930    Austria
    139,266    11/1934    Austria
    139,602    11/1934    Austria
  1,106,867     5/1961    Fed. Rep. of Germany
  1,589,249     6/1970    Fed. Rep. of Germany
  2,657,893     7/1977    Fed. Rep. of Germany--.
```

First page, 2nd col., following second line under "OTHER PUBLICATIONS", insert:

--W. W. Duley, $CO_2$-Lasers, Effects and Applications, Academic Press, New York, S. Francisco, London 1976, pp. 15 to 72

A Pamphlet of Kristalloptik-LaserBau for the KEL T51 and T52 Lasers (1979)

J. F. Waymouth, Electric Discharge Lamps, The M.I.T. Press, pp. 307-335--.

UNITED STATES PATENT AND TRADEMARK OFFICE
CERTIFICATE OF CORRECTION

PATENT NO. : 4,430,738

DATED : Feb. 7, 1984

INVENTOR(S) : Reif et al.

It is certified that error appears in the above—identified patent and that said Letters Patent is hereby corrected as shown below:

Col. 2, line 3, "inhomogenities" should read --inhomogeneities--

Col. 4, line 19, "e.g." should read -- , e.g., --.

Signed and Sealed this

Twenty-second Day of May 1984

[SEAL]

Attest:

GERALD J. MOSSINGHOFF

Attesting Officer

Commissioner of Patents and Trademarks